(12) United States Patent
Yang et al.

(10) Patent No.: US 7,953,059 B2
(45) Date of Patent: May 31, 2011

(54) APPARATUS AND METHOD FOR DETECTING FEEDBACK INFORMATION IN A WIRELESS COMMUNICATION SYSTEM

(75) Inventors: Ha-Young Yang, Yongin-si (KR); Joon-Young Bae, Seoul (KR); Jae-Ho Jeon, Seongnam-si (KR); Seung-Joo Maeng, Seongnam-si (KR); Chang-Soo Park, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 725 days.

(21) Appl. No.: 11/523,856

(22) Filed: Sep. 20, 2006

(65) Prior Publication Data

US 2007/0070967 A1 Mar. 29, 2007

(30) Foreign Application Priority Data

Sep. 26, 2005 (KR) ........................ 10-2005-0089250

(51) Int. Cl.
*H04B 7/216* (2006.01)
(52) U.S. Cl. ........ 370/342; 370/208; 370/150; 370/335; 370/210; 370/340; 455/67; 455/69; 375/142; 375/150; 375/335
(58) Field of Classification Search .................. 370/208, 370/210, 335, 342; 375/150, 260, 340; 455/67, 455/69
See application file for complete search history.

(56) References Cited

U.S. PATENT DOCUMENTS

| | | | | |
|---|---|---|---|---|
| 4,519,080 A * | 5/1985 | Snyder, Jr. | .................... | 714/793 |
| 6,370,397 B1 * | 4/2002 | Popovic et al. | ................ | 455/561 |
| 6,456,646 B1 * | 9/2002 | Asokan et al. | ................ | 375/142 |
| 6,977,974 B1 * | 12/2005 | Geraniotis et al. | ............ | 375/340 |
| 6,996,156 B1 * | 2/2006 | Ono | ............................... | 375/147 |
| 2001/0017883 A1 * | 8/2001 | Tiirola et al. | ................. | 375/148 |
| 2003/0124995 A1 * | 7/2003 | Tanaka | .......................... | 455/101 |
| 2003/0148738 A1 * | 8/2003 | Das et al. | ..................... | 455/67.5 |
| 2005/0213645 A1 * | 9/2005 | Nishimura et al. | ........... | 375/150 |
| 2006/0209670 A1 * | 9/2006 | Gorokhov et al. | ............ | 370/208 |

FOREIGN PATENT DOCUMENTS

| | | |
|---|---|---|
| JP | 2001-168777 | 6/2001 |
| JP | 2002-290317 | 10/2002 |

(Continued)

OTHER PUBLICATIONS

Inseok Hwang et al., "Reuse of Cqich Fast Feed-Back Sub-Channels", IEEE 802.16 Broadband Wireless Access Working Group, pp. 1-6, Mar. 9, 2005.

(Continued)

*Primary Examiner* — Kamran Afshar
*Assistant Examiner* — Khalid Shaheed
(74) *Attorney, Agent, or Firm* — The Farrell Law Firm, P.C.

(57) ABSTRACT

An apparatus and method for determining feedback information detection in a broadband wireless communication system are provided. In the detection determining apparatus, a demodulator correlates each of tiles carrying received feedback information with an orthogonal vector including a pilot symbol in each possible codeword, each tile being a predetermined number of subcarriers, and calculates the squares of the absolute values of the correlations. A codeword correlation calculator sums the squares of the absolute value of the correlations of the tiles for each possible codeword. A detection decider determines whether to perform detection on the feedback information based on the maximum of the sums.

9 Claims, 9 Drawing Sheets

FOREIGN PATENT DOCUMENTS

| | | |
|---|---|---|
| JP | 2005-006337 | 1/2005 |
| JP | 2005-027107 | 1/2005 |
| JP | 2006-197597 | 7/2006 |
| KR | 102002009274 | 12/2002 |
| KR | 1020050071507 | 7/2005 |
| KR | 20050114569 | 12/2005 |

OTHER PUBLICATIONS

Myung-Kwan Byun et al., "Fast_Feedback Channel Codeword Extension", IEEE 802.16 Broadband Wireless Access Working Group, pp. 1-10, Aug. 17, 2004.

* cited by examiner

| CODEWORD / INFORMATION | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 0 | 1 | 2 | 3 | 4 | 5 | 6 | 7 |
| A1 | 0 | 1 | 2 | 3 | 4 | 5 | 6 | 7 | 1 | 2 | 3 | 4 | 5 | 6 | 7 | 0 |
| A2 | 0 | 1 | 2 | 3 | 4 | 5 | 6 | 7 | 2 | 3 | 4 | 5 | 6 | 7 | 0 | 1 |
| A3 | 0 | 1 | 2 | 3 | 4 | 5 | 6 | 7 | 3 | 4 | 5 | 6 | 7 | 0 | 1 | 2 |
| A4 | 0 | 1 | 2 | 3 | 4 | 5 | 6 | 7 | 4 | 5 | 6 | 7 | 0 | 1 | 2 | 3 |
| A5 | 0 | 1 | 2 | 3 | 4 | 5 | 6 | 7 | 5 | 6 | 7 | 0 | 1 | 2 | 3 | 4 |

FIG.3

| CODEWORD / INFORMATION | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 2 | 3 | 0 | 1 | 6 | 7 | 4 | 5 |
| A1 | 0 | 1 | 2 | 3 | 4 | 5 | 6 | 7 | 4 | 5 | 6 | 7 | 0 | 1 | 2 | 3 |
| A2 | 0 | 1 | 2 | 3 | 4 | 5 | 6 | 7 | 3 | 2 | 1 | 0 | 7 | 6 | 5 | 4 |
| A3 | 0 | 1 | 2 | 3 | 4 | 5 | 6 | 7 | 6 | 7 | 4 | 5 | 2 | 3 | 0 | 1 |
| A4 | 0 | 1 | 2 | 3 | 4 | 5 | 6 | 7 | 7 | 6 | 5 | 4 | 3 | 2 | 1 | 0 |
| A5 | 0 | 1 | 2 | 3 | 4 | 5 | 6 | 7 | 5 | 4 | 7 | 6 | 1 | 0 | 3 | 2 |

| CODEWORD / INFORMATION | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| A0 | 4 | 5 | 6 | 7 | 0 | 1 | 2 | 3 | 3 | 2 | 1 | 0 | 7 | 6 | 5 | 4 |
| A1 | 3 | 2 | 1 | 0 | 7 | 6 | 5 | 4 | 6 | 7 | 4 | 5 | 2 | 3 | 0 | 1 |
| A2 | 6 | 7 | 4 | 5 | 2 | 3 | 0 | 1 | 7 | 6 | 5 | 4 | 3 | 2 | 1 | 0 |
| A3 | 7 | 6 | 5 | 4 | 3 | 2 | 1 | 0 | 5 | 4 | 7 | 6 | 1 | 0 | 3 | 2 |
| A4 | 5 | 4 | 7 | 6 | 1 | 0 | 3 | 2 | 1 | 0 | 3 | 2 | 5 | 4 | 7 | 6 |
| A5 | 1 | 0 | 3 | 2 | 5 | 4 | 7 | 6 | 2 | 3 | 0 | 1 | 6 | 7 | 4 | 5 |

| CODEWORD / INFORMATION | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| A0 | 6 | 7 | 4 | 5 | 2 | 3 | 0 | 1 | 7 | 6 | 5 | 4 | 3 | 2 | 1 | 0 |
| A1 | 7 | 6 | 5 | 4 | 3 | 2 | 1 | 0 | 5 | 4 | 7 | 6 | 1 | 0 | 3 | 2 |
| A2 | 5 | 4 | 7 | 6 | 1 | 0 | 3 | 2 | 1 | 0 | 3 | 2 | 5 | 4 | 7 | 6 |
| A3 | 1 | 0 | 3 | 2 | 5 | 4 | 7 | 6 | 2 | 3 | 0 | 1 | 6 | 7 | 4 | 5 |
| A4 | 2 | 3 | 0 | 1 | 6 | 7 | 4 | 5 | 4 | 5 | 6 | 7 | 0 | 1 | 2 | 3 |
| A5 | 4 | 5 | 6 | 7 | 0 | 1 | 2 | 3 | 3 | 2 | 1 | 0 | 7 | 6 | 5 | 4 |

| CODEWORD / INFORMATION | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| A0 | 5 | 4 | 7 | 6 | 1 | 0 | 3 | 2 | 1 | 0 | 3 | 2 | 5 | 4 | 7 | 6 |
| A1 | 1 | 0 | 3 | 2 | 5 | 4 | 7 | 6 | 2 | 3 | 0 | 1 | 6 | 7 | 4 | 5 |
| A2 | 2 | 3 | 0 | 1 | 6 | 7 | 4 | 5 | 4 | 5 | 6 | 7 | 0 | 1 | 2 | 3 |
| A3 | 4 | 5 | 6 | 7 | 0 | 1 | 2 | 3 | 3 | 2 | 1 | 0 | 7 | 6 | 5 | 4 |
| A4 | 3 | 2 | 1 | 0 | 7 | 6 | 5 | 4 | 6 | 7 | 4 | 5 | 2 | 3 | 0 | 1 |
| A5 | 6 | 7 | 4 | 5 | 2 | 3 | 0 | 1 | 7 | 6 | 5 | 4 | 3 | 2 | 1 | 0 |

FIG.4

| VECTOR INDEX | SUBCARRIER MODULATION VECTORS (SUBCARRIER 0, SUBCARRIER 1,··· SUBCARRIER 7) |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

APPARATUS AND METHOD FOR DETECTING FEEDBACK INFORMATION IN A WIRELESS COMMUNICATION SYSTEM

PRIORITY

This application claims priority under 35 U.S.C. §119 to a Korean application filed in the Korean Intellectual Property Office on Sep. 26, 2005 and assigned Serial No. 2005-89250, the contents of which are incorporated herein by reference.

BACKGROUND OF THE INVENTION

1. Field of the Invention

The present invention relates generally to an apparatus and method for detecting feedback information in a broadband wireless communication system, and in particular, to an apparatus and method for detecting uplink fast feedback information using data symbols and pilot symbols included in the uplink fast feedback information in a broadband wireless communication system.

2. Description of the Related Art

In a high-speed mobile communication system, a Base Station (BS) schedules packet data transmission and determines transmission parameters using uplink fast feedback information representing downlink channel quality, to thereby provide high-speed packet data service to Mobile Stations (MSs). Upon receipt of the uplink fast feedback signals from the MSs, the BS checks the downlink channel statuses to the MSs based on the feedback information. The BS then selects MSs having the best downlink channel quality according to the channel status information in slot and sends packet data to them. The BS also determines transmission parameters (e.g. data rate, code rate, and modulation order) according to the downlink channel quality of the selected MSs. The uplink fast feedback information may include a Signal-to-Noise Ratio (SNR), a Carrier-to-Interference Ratio (C/I), the differential SNR of each band, a fast Multiple Input Multiple Output (MIMO) feedback, or a mode selection feedback. Additional physical channels are configured for delivering the uplink fast feedback information in an Orthogonal Frequency Division Multiple Access (OFDMA) communication system.

The BS necessarily uses C/Is measured at the MSs in determining the downlink channel quality. The MSs measure C/Is and feed back the C/I measurements to the BS on physical channels, e.g. Channel Quality Indicator CHannels (CQICHs). The BS schedules downlink data for the MSs and determines transmission parameters based on the C/I measurements.

The C/I information, by which downlink data rates and cell throughput are determined, has to be sent with high reliability despite its small size, because it is very critical to the operation of the communication system. Yet, it is typical not to allocate much time-frequency resources to the physical channels carrying the fast feedback information in order to reduce overhead. Accordingly, there exists a need for an efficient detection method to enable reliable transmission.

Figure 1:
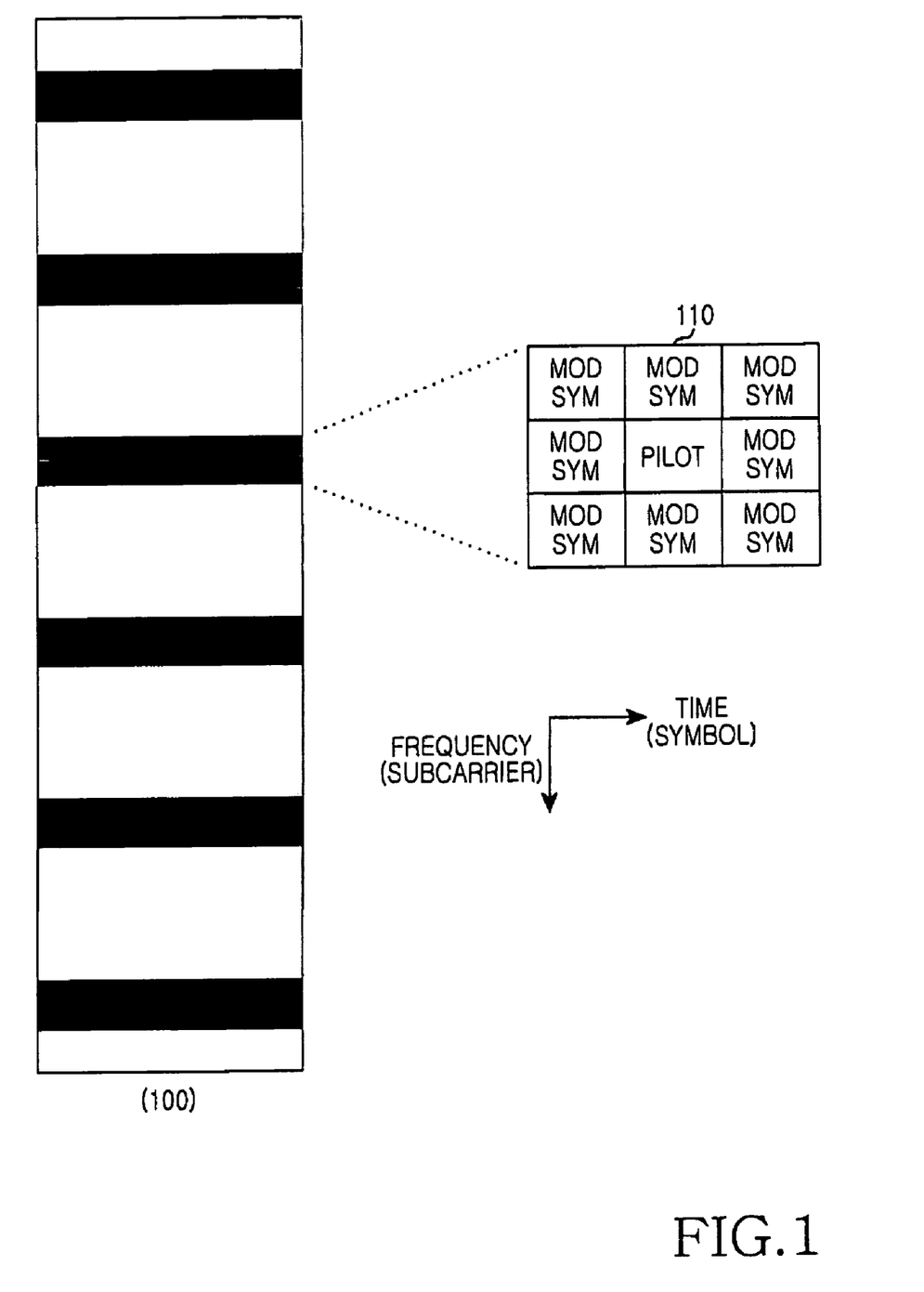
FIG. 1 illustrates typical 3×3 frequency-time resources allocated for feedback information.
Figure 2:
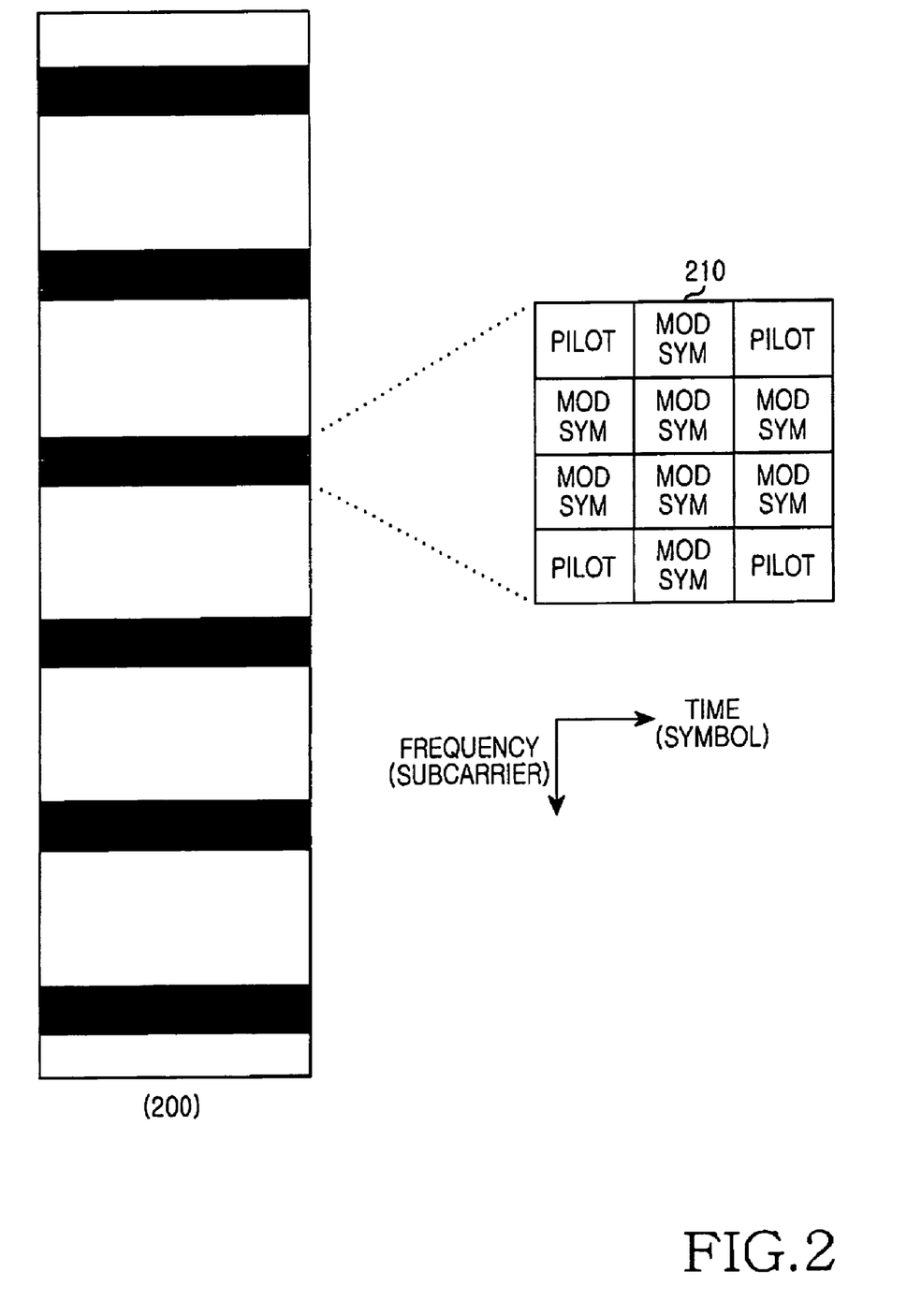
FIG. 2 illustrates typical 4×3 frequency-time resources allocated for feedback information.

The configurations of channels for delivering the fast feedback information are illustrated in FIGS. 1 and 2. The channels are an Optional Partial Usage of SubChannel (OPUSC) in FIG. 1 and a Partial Usage of SubChannel (PUSC) in FIG. 2, respectively.

Referring to FIG. 1, six tiles 100 are allocated, each tile having a set of 3×3 subcarriers 110 on a frequency-time domain. Eight surrounding subcarriers deliver modulation symbols (MOD SYM in FIG. 1) and the remaining center subcarrier delivers a pilot symbol in the 3×3 subcarrier set 110.

Referring to FIG. 2, six tiles 200 are allocated, each tile having a set of 4×3 subcarriers 210 on the frequency-time domain. Four corner subcarriers deliver pilot symbols and the remaining eight subcarriers deliver modulation symbols (MOD SYM in FIG. 1) in the 4×3 subcarrier set 210.

Figure 3:
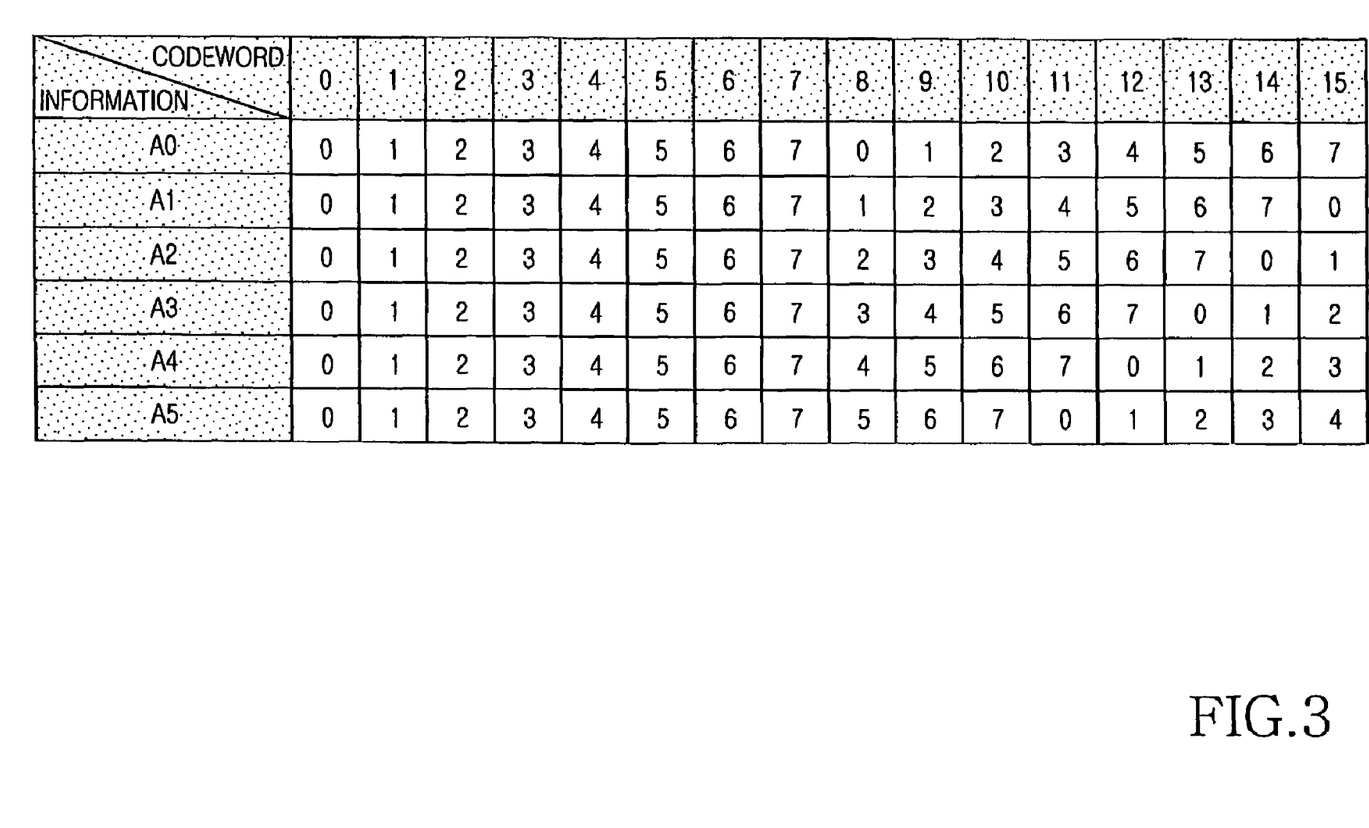
FIG. 3 is a listing of typical codewords that can be generated from a channel encoder for the input of 4-bit information data.
Figure 5:
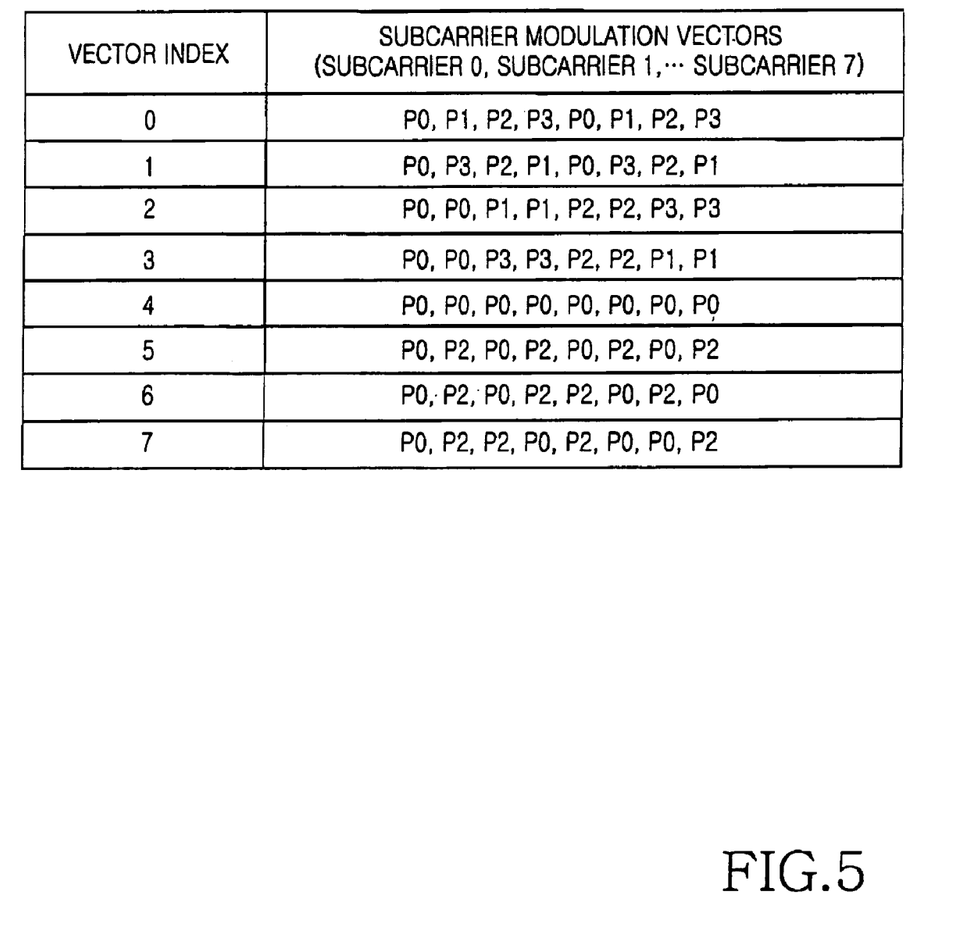
FIG. 5 is a listing of typical orthogonal vectors for use in modulation.

In the case where an MS sends uplink fast feedback information on either of the channels illustrated in FIGS. 1 and 2, upon generation of uplink fast feedback information data, it modulates a codeword corresponding to the feedback information data in a non-coherent manner and sends the modulation symbols. For example, for the input of 4-bit information data, the MS creates a codeword (0~15 for each tile A0, A1, A2, A3, A4 and A5) as illustrated in FIG. 3. The MS maps orthogonal vectors corresponding to the codeword to predetermined tiles by non-coherent modulation. Specifically, the MS maps the orthogonal vector corresponding to each codeword of A0 to a first tile, the orthogonal vector corresponding to each codeword of A1 to a second tile, and the orthogonal vector corresponding to each codeword of A2 to a third tile. In the same manner, the MS maps the orthogonal vector corresponding to each codeword of A5 to the last tile through non-coherent modulation. Orthogonal vectors corresponding to codewords are illustrated in FIG. 5.

Figure 4:
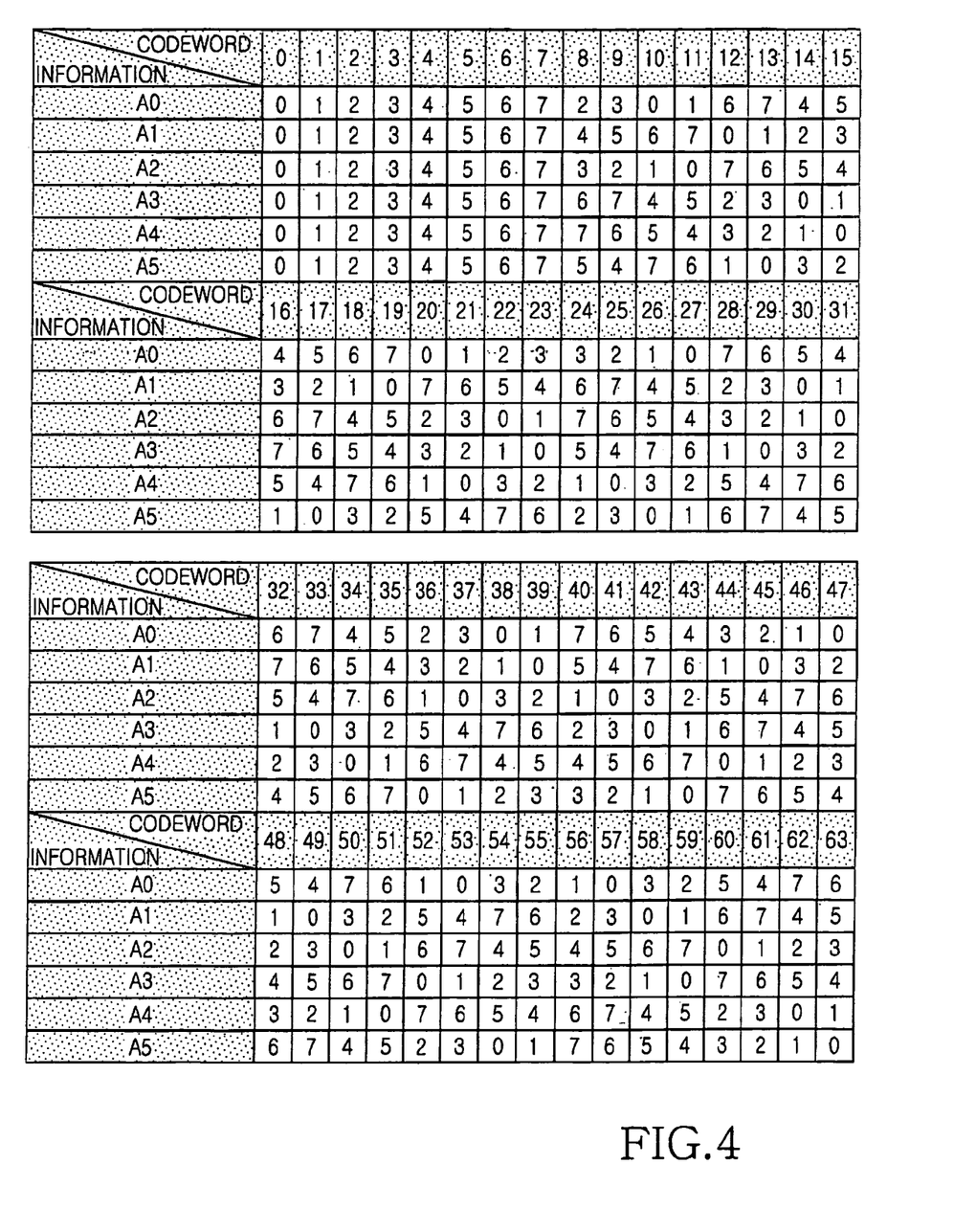
FIG. 4 is a listing of typical codewords that can be generated from the channel encoder for the input of 6-bit information data.

As described above, FIGS. 3 and 4 illustrate codewords that can be generated from an M-ary channel encoder. $2^4(=16)$ codewords that are generated for the input of four information data bits are shown in FIG. 3, while $2^6(=64)$ codewords that can be generated for the input of six information data bits are shown in FIG. 4. Orthogonal vectors used for orthogonal modulation of the codewords are listed in FIG. 5.

$$P0(\exp(j\tfrac{\pi}{4})),\ P1\left(\exp\left(j\tfrac{3\pi}{4}\right)\right),\ P2\left(\exp\left(-j\tfrac{3\pi}{4}\right)\right),\ \text{and}\ P3\left(\exp\left(-j\tfrac{\pi}{4}\right)\right)$$

are Quadrature Phase Shift Keying (QPSK) symbols. Pilot symbols, which are known to both the BS and the MS, are generally multiplied by a scrambling code and modulated in Binary Phase Shift Keying (BPSK).

Now, reception of the uplink fast feedback information sent in the above-described manner is described. The BS, upon receipt of the uplink fast feedback information, decides soft-decision values of the symbols of the feedback information by non-coherent demodulation. Then the BS determines a codeword corresponding to the soft-decision values and outputs the information data bits corresponding to the codeword.

In the case of 4-bit information data, for example, upon receipt of feedback information, the BS correlates modulation symbols on eight subcarriers in each of the six tiles where the feedback information is received as illustrated in FIG. 1 with orthogonal vectors (symbols) corresponding to each codeword for the tiles, and calculates the square of the absolute value of the correlation as expressed by the following Equation (1):

$$\left| \sum_{k=1}^{\text{\# of Fast Feedback tones per tile }(=8)} X_k^* Y_k \right|^2 \qquad (1)$$

where $X_k$ denotes a orthogonal vector (symbol) corresponding to a codeword on a $k^{th}$ subcarrier, $Y_k$ denotes a symbol received on the $k^{th}$ subcarrier in the tile, k denotes a subcarrier index and superscript * denotes complex conjugate operation.

For each of all 16 codewords that are generated from 4-bit information data, the BS sums the squares of the absolute values of the correlations of all 16 codewords for all 6 tiles, then selects a codeword corresponding to the maximum of the sums. The BS determines information data corresponding to a codeword having the maximum sum to be feedback information transmitted by the MS.

To render the detection reliable, the average of the sums with respect to the 16 codewords for all 6 tiles is calculated. If the difference between the maximum and the average exceeds a predetermined threshold, the BS determines that the detected information data bits are reliable.

The process of detecting uplink fast feedback information is expressed as Equation (2):

$$\max_n \left\{ \sum_{m=1}^{\# \text{ of tiles } (=6)} \left| \sum_{k=1}^{\# \text{ of Fast Feedback tones per tile } (=8)} X^*_{n,m,k} Y_{m,k} \right|^2, \right.$$

$$\left. n = 0, 1, \ldots, 15 \right\} -$$

$$\text{avrg}_n \left\{ \sum_{m=1}^{\# \text{ of tiles } (=6)} \left| \sum_{k=1}^{\# \text{ of Fast Feedback tones per tile } (=8)} X^*_{n,m,k} Y_{m,k} \right|^2, \right.$$

$$\left. n = 0, 1, \ldots, 15 \right\} > \text{threshold}$$

where $Y_{m,k}$ denotes a symbol received on a $k^{th}$ subcarrier in an $m^{th}$ tile, $X_{n,m,k}$ denotes a orthogonal vector (symbol) corresponding to an $n^{th}$ codeword for the $k^{th}$ subcarrier in the $m^{th}$ tile, n denotes a codeword index (e.g. $2^4$(n=0, ..., 15)), m denotes a tile index (m=0, 1, 2, 3, 4, 5), and k denotes a subcarrier index (k=0, 1, ..., 7) and superscript * denotes complex conjugate operation.

Here, information data corresponding to a codeword having the maximum of the sums of the squares of the absolute values of the correlations is deemed to be transmitted as feedback information.

As described above, an uplink subchannel carries uplink fast feedback information. To detect information bits, received symbols are decoded using only orthogonal vectors corresponding to a codeword, without utilizing full knowledge of the subchannel carrying the uplink fast feedback information. In this context, the conventional detection method may be improved.

SUMMARY OF THE INVENTION

An object of the present invention is to substantially solve at least the above problems and/or disadvantages and to provide at least the advantages below. Accordingly, an object of the present invention is to provide an apparatus and method for efficiently detecting uplink fast feedback information using time-frequency resources in an Orthogonal Frequency Division Multiple Access (OFDMA) broadband wireless communication system.

Another object of the present invention is to provide an apparatus and method for detecting uplink fast feedback information based on full knowledge of a control subchannel carrying the uplink fast feedback information in an OFDM broadband wireless communication system.

The above objects are achieved by providing an apparatus and method for determining feedback information detection in a broadband wireless communication system.

According to an aspect of the present invention, in an apparatus for determining feedback information detection in a broadband wireless communication system, a demodulator correlates each of tiles carrying received feedback information with an orthogonal vector including a pilot symbol in each possible codeword, each tile being a predetermined number of subcarriers, and calculates the squares of the absolute values of the correlations. A codeword correlation calculator sums the squares of the absolute value of the correlations of the tiles for each possible codeword. A detection decider determines whether to perform detection on the feedback information based on the maximum of the sums.

According to another aspect of the present invention, in a method of determining feedback information detection in a broadband wireless communication system, upon receipt of the feedback signal (each of the tiles being a predetermined number of subcarriers) tiles are separated from a feedback signal. Each of tiles carrying received feedback information is correlated with an orthogonal vector including a pilot symbol in each possible codeword; and the squares of the absolute values of the correlations are calculated (each tile being a set of subcarriers). The squares of the absolute value of the correlations of the tiles are summed for each possible codeword. The maximum of the sums is selected, the average of the sums is calculated, and it is determined whether to perform detection on the feedback information according to a predetermined threshold.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a technique for detecting uplink fast feedback information based on full knowledge of a control subchannel carrying the uplink fast feedback information. Pilot symbols in addition to the modulation symbols are also used for detecting uplink fast feedback information in an OFDMA broadband wireless communication.

The following description will be made in the context of an OFDMA broadband wireless communication system, by way of example.

Figure 6:
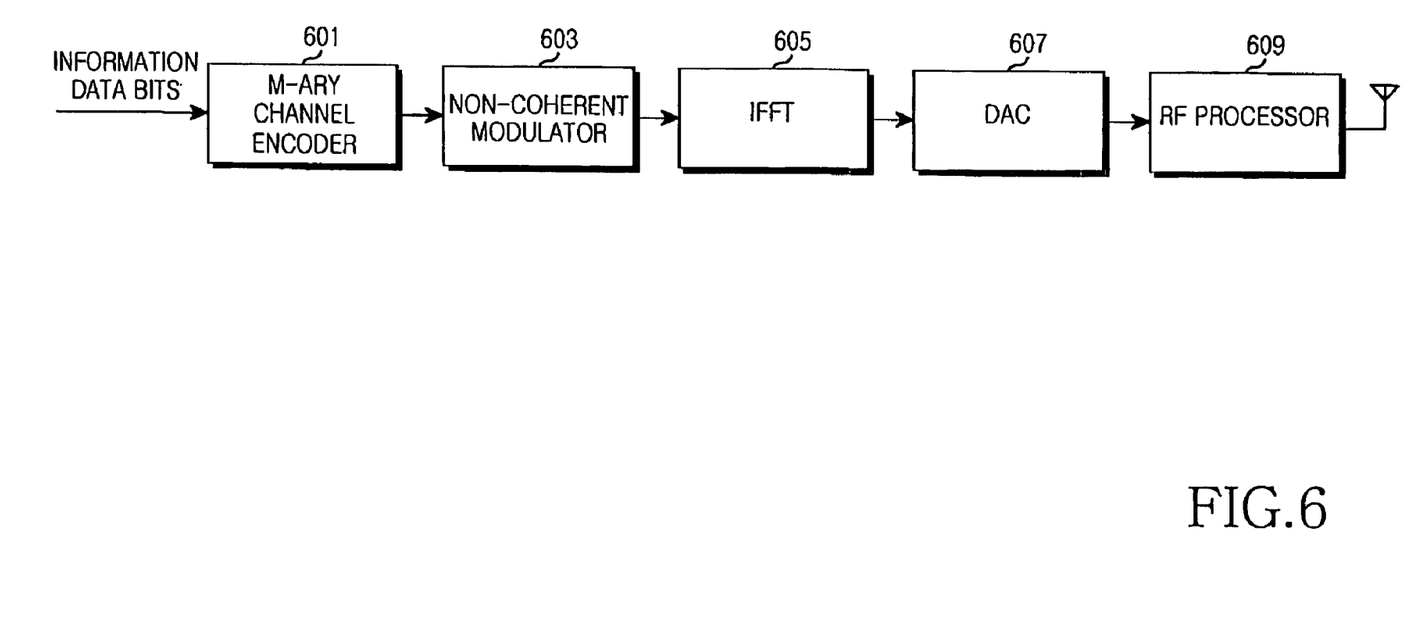
FIG. 6 is a block diagram of an MS for sending feedback information according to the present invention.

Referring to FIG. 6, the MS includes a channel encoder 601, a non-coherent modulator 603, an Inverse Fast Fourier Transform (IFFT) processor 605, a Digital-to-Analog Converter (DAC) 607, and a Radio Frequency (RF) processor 609.

The channel encoder 601 encodes uplink fast feedback information data and the non-coherent modulator 603 generates transmission symbols corresponding to the codeword received from the channel encoder 601 by non-coherent modulation.

The IFFT processor 605 IFFT-converts the frequency domain transmission symbols to time domain data (i.e. an OFDM symbol). The DAC 607 converts the sample data to an analog signal, and the RF processor 609 converts the analog signal to an RF signal and sends the RF signal through an antenna.

Figure 7:
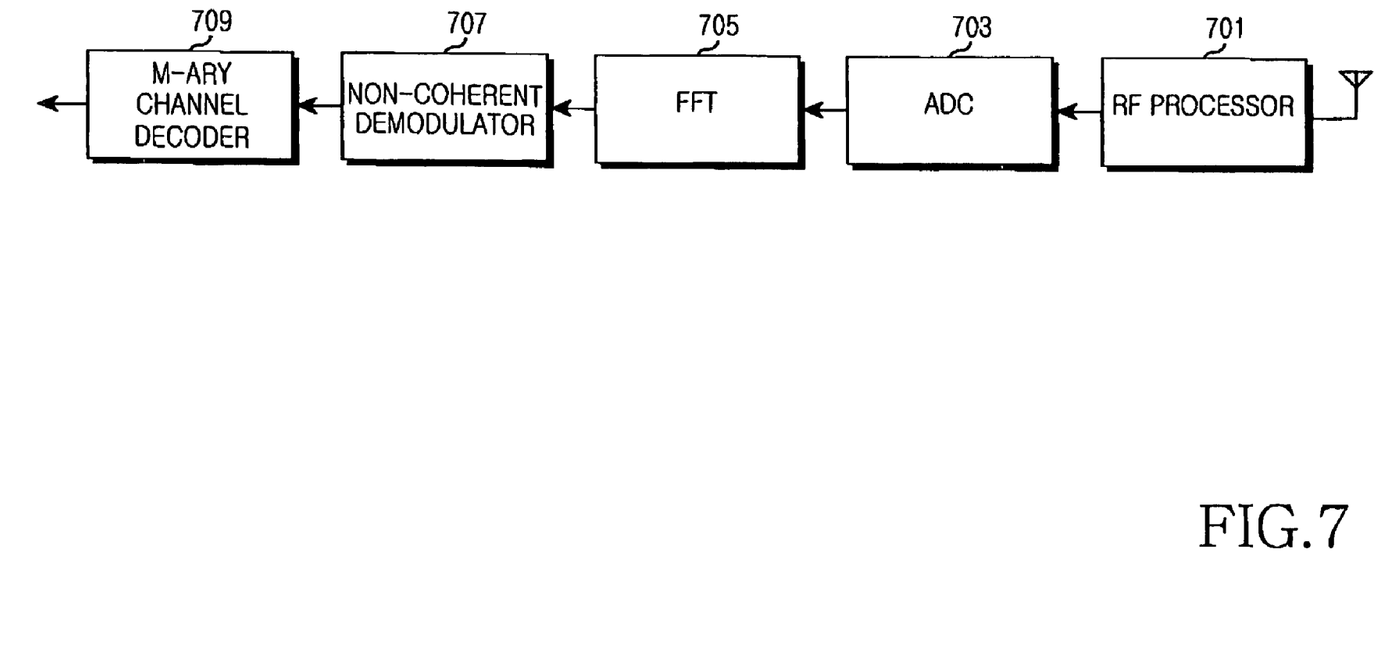
FIG. 7 is a block diagram of a BS for receiving feedback information according to the present invention.

Referring to FIG. 7, the BS includes an RF processor 701, an Analog-to-Digital Converter (ADC) 703, a Fast Fourier Transform (FFT) processor 705, a non-coherent demodulator 707, and a channel decoder 709.

The RF processor 701 converts an RF signal received through an antenna to an analog baseband signal and the ADC 703 converts the analog signal to a digital signal. The FFT processor 705 FFT-converts time domain data received by the ADC 703 to frequency domain data.

The non-coherent demodulator 707 calculates soft-decision values of the symbols received from the FFT processor 705. The channel decoder 709 determines the reliability of the received feedback information using the soft-decision values. If the feedback information is reliable, the channel decoder 709 determines a codeword corresponding to the soft-decision values by decoding the soft-decision values at a predetermined code rate, and recovers information bits corresponding to the codeword.

Figure 8:
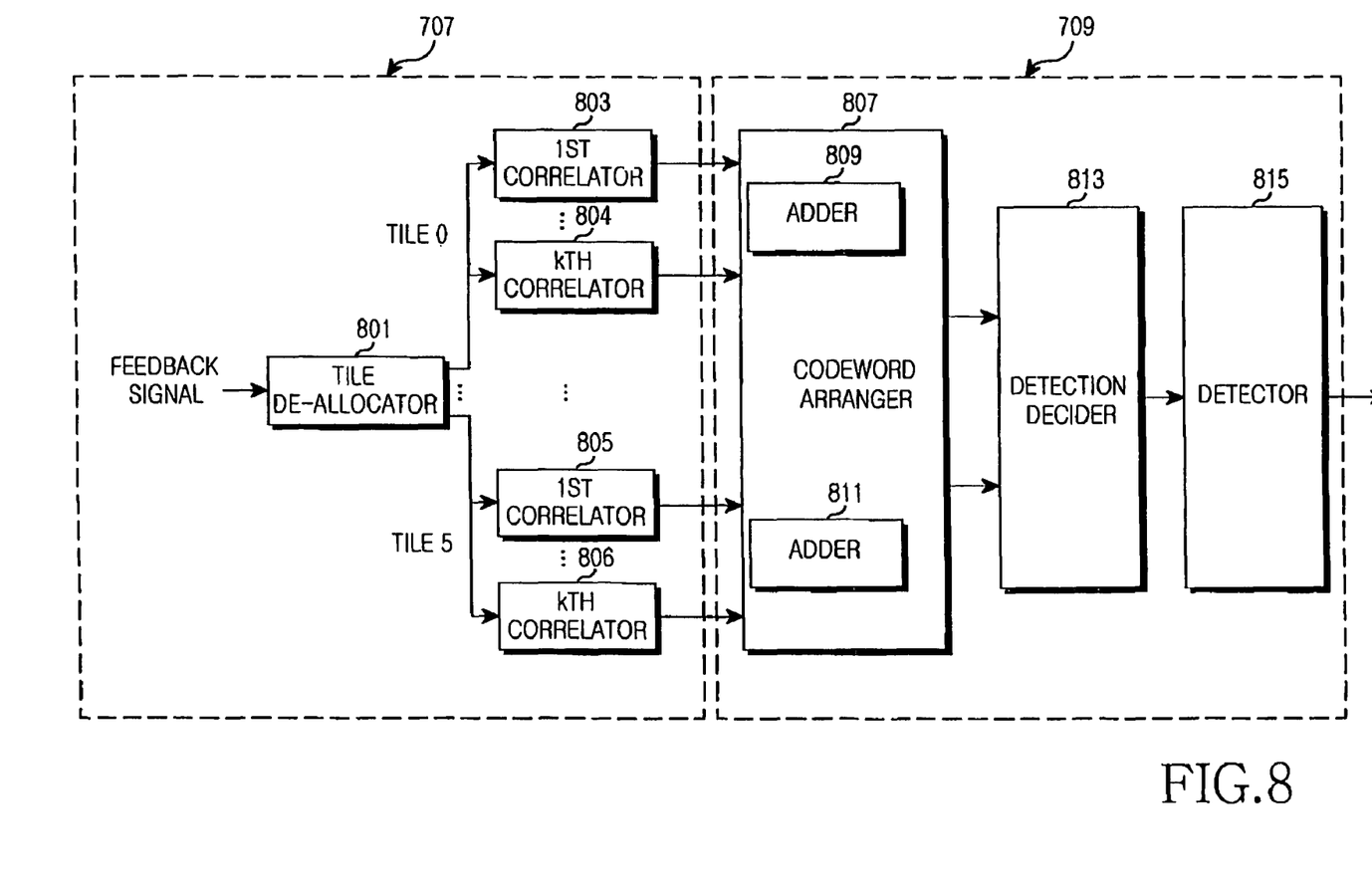
FIG. 8 is a block diagram of an apparatus for determining detection of feedback information in the BS according to the present invention.

Referring to FIG. 8, the non-coherent demodulator 707 includes a tile de-allocator 801 and correlators 803 to 806. The channel decoder 709 includes a codeword arranger 807, a detection decider 813, and a detector 815.

The tile de-allocator 801 receives the symbols of the FFT feedback signal received from the FFT processor 705 and separates a predetermined number of tiles (e.g. 6 tiles) each having 3×3 subcarriers from the symbols. For example, six tiles are separated from one subchannel in FIGS. 1 and 2.

For every codeword, the correlator 803 to 806 correlate the subcarriers (tones) of each of the tiles with an orthogonal vector corresponding to the codeword and calculates the square of the absolute value of the correlation of the tile. Specifically, the subcarriers of a first tile are correlated with eight possible orthogonal vectors and a pilot symbol and the absolute values of the correlations are squared as Equation (3). The number of the correlators 803 to 806 is equal to that of subcarriers per tile (eight modulation symbols and one pilot symbol). Thus, a received 3×3 subcarrier set (i.e. tile) with eight modulation symbols and one pilot symbol is correlated with an orthogonal vector that can be represented as a 3×3 subcarrier set with eight modulation symbols and one pilot symbol.

$$\left| \sum_{k=1}^{\text{\# of Fast Feedback tones per tile (=8)}} X_{m,k}^* Y_{m,k} + \sum_{k'=1}^{\text{\# of pilot tones per tile (=1)}} Q_{m,k'}^* Y'_{m,k'} \right|^2 \quad (3)$$

where $Y_{m,k}$ denotes a symbol received on a $k^{th}$ subcarrier of an $m_{th}$ tile, $Y'_{m,k}$ denotes a pilot symbol received on a $k'^{th}$ subcarrier of the $m_{th}$ tile, $X_{m,k}$ denotes a orthogonal vector (symbol) corresponding to codeword on the $k^{th}$ subcarrier in the $m^{th}$ tile, $Q_{m,k'}$ denotes a transmitted pilot symbol on the $k'^{th}$ subcarrier of the orthogonal vector corresponding to the $m^{th}$ tile, m denotes a subcarrier index (m=0, 2, . . . , 5), k denotes a subcarrier index (k=0, 2, . . . , 7), and k' denotes a pilot subcarrier index and superscript * denotes complex conjugate operation.

In the codeword arranger 807, adders 809 to 811 sum the squares of the absolute values of the correlations of six tiles received from the correlators 803 to 806 on a codeword-by-codeword basis for 16 codewords (codeword 0 to codeword 15). The codeword arranger 807 then averages the sums with respect to the 16 codewords.

The detection decider 813 selects a codeword having the maximum (MAX) of the sums received from the codeword arranger 807. The information signal corresponding to a codeword having the maximum sum is deemed to be feedback information transmitted by the MS. Then, in order to determine the reliability of the received feedback signal, the detection decider 813 then compares the difference value with the average (AVG) of the sums with a predetermined threshold and decides whether to detect the received feedback signal based on the comparison result according to Equation (4).

$$\max_{n} \left\{ \sum_{m=1}^{\text{\# of tiles (=6)}} \left[ \left| \sum_{k=1}^{\text{\# of Fast Feedback tones per tile (=8)}} X_{n,m,k}^* Y_{m,k} + \sum_{k'=1}^{\text{\# of pilot tones per tile (=1)}} Q_{n,m,k'}^* Y'_{m,k'} \right|^2 \right], \\ n = 0, 1, \ldots, 15 \right\} - \quad (4)$$

-continued $$\text{avrg}_n \left\{ \left[ \sum_{m=1}^{\text{\# of tiles }(=6)} \left| \sum_{k=1}^{\substack{\text{\# of Fast Feedback tones} \\ \text{per tile }(=8)}} X^*_{n,m,k} Y_{m,k} + \sum_{k'=1}^{\text{\# of pilot tones per tile }(=1)} Q^*_{,m,k'} Y'_{m,k'} \right|^2 \right] \right. $$
$$\left. n = 0, 1, \ldots, 15 \right\} \geq \text{threshold}$$

where $Y_{m,k}$ denotes a symbol received on a $k^{th}$ subcarrier in an $m^{th}$ tile, $Y'_{m,k'}$ denotes a pilot symbol received on a $k'^{th}$ subcarrier in the $m^{th}$ tile, $X_{n,m,k}$ denotes a orthogonal vector (symbol) corresponding to an $n^{th}$ codeword for the $k^{th}$ subcarrier in the $m^{th}$ tile, $Q_{m,k'}$ denotes a transmitted pilot symbol for the $k^{th}$ subcarrier of the $m^{th}$ tile, n denotes a codeword index (e.g. $2^4$(m=0, ..., 15)), m denotes a tile index (m=0, 1, ..., 5), k denotes a subcarrier index (k=0, 1, ... 7), and k' denotes a pilot subcarrier index and superscript * denotes complex conjugate operation.

Here, information signal corresponding to a codeword having the maximum of the sums of the squares of the absolute values of the correlations is deemed to be transmitted as a feedback information.

And, if the difference between the maximum sum and the average sum satisfies the condition expressed in Equation (4), that is, if the difference is equal to or greater than the threshold ((MAX−AVG)≧Th), the detection decider 813 provides the codeword with the maximum sum to the detector 815, considering that the information data of the codeword is reliable. The detector 815 detects the feedback information received from the detection decider 813.

On the other hand, if the difference is less than the threshold ((MAX−AVG)<Th), the detection decider 813 does not detect the feedback information, determining that the reception environment of the feedback information is bad.

The following description is based on the assumption that each tile is defined by 3×3 subcarriers as illustrated in FIG. 1 and 4-bit information data is used.

Figure 9:
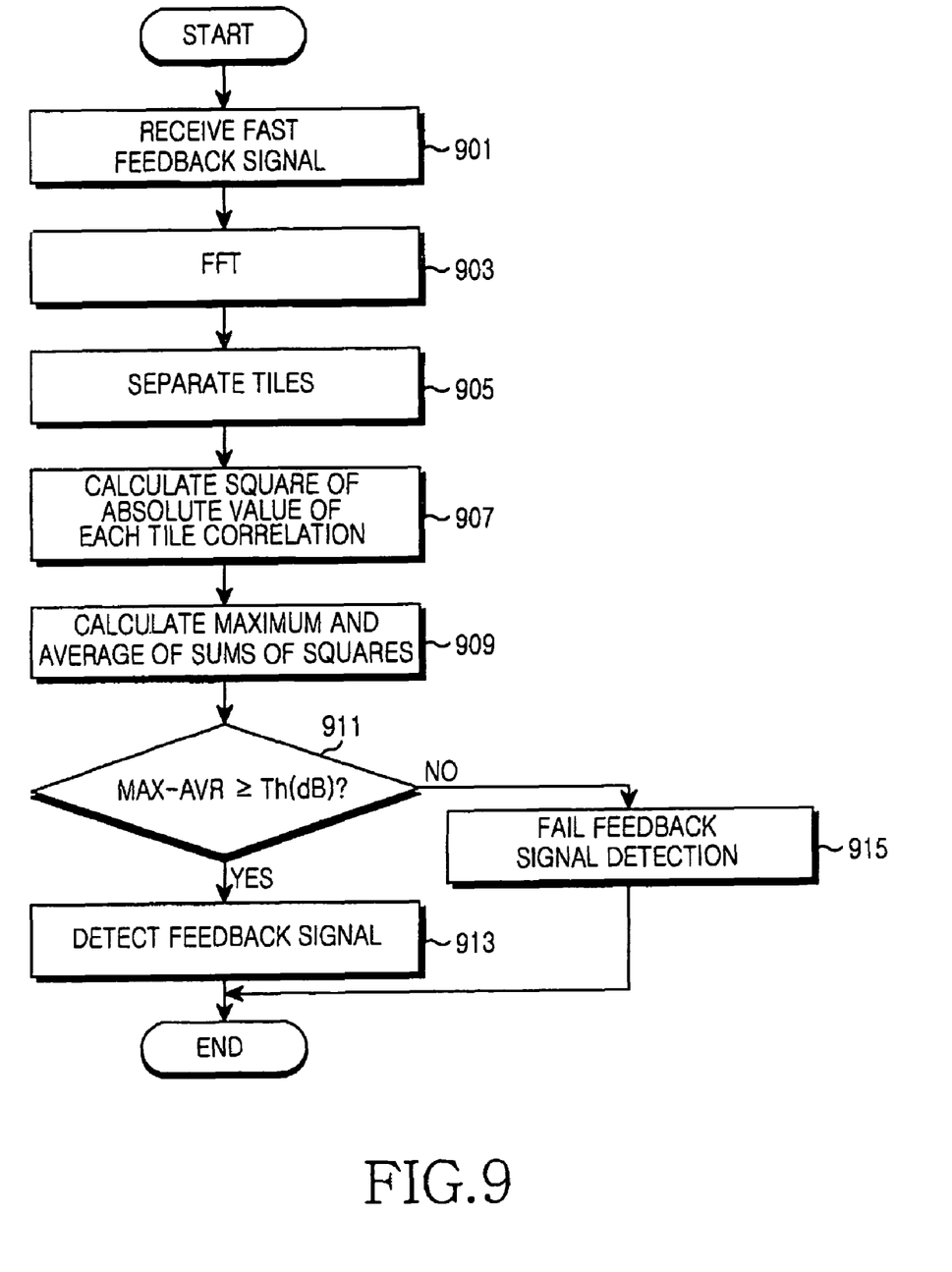
FIG. 9 is a flowchart illustrating a feedback information detecting operation according to the present invention.

Referring to FIG. 9, the BS monitors reception of an uplink fast feedback signal in step 901. Upon receipt of the uplink fast feedback signal, the BS converts the received time-domain feedback signal to a frequency signal by FFT in step 903.

In step 905, the BS separates tiles from the FFT feedback signal. For example, six tiles are separated from one subchannel in FIGS. 1 and 2.

For each codeword, the BS correlates the subcarriers (tones) of each of the tiles with an orthogonal vector corresponding to the codeword and calculates the square of the absolute value of the correlation of the tile according to Equation (3) in step 907. The correlation is performed in such a manner that a received 3×3 subcarrier set (i.e. tile) with eight modulation symbols and one pilot symbol is correlated with an orthogonal vector that can be represented as a 3×3 subcarrier set with eight modulation symbols and one pilot symbol.

In step 909, the BS sums the squares of the absolute values of the correlations of six tiles on a codeword-by-codeword basis for 16 possible codewords. The codeword arranger 807 then averages the sums with respect to the 16 codewords.

Then the BS selects the maximum of the sums and calculates the average of the sums with respect to the 16 codewords.

In step 911, the BS compares the difference between the maximum sum and the average sum with a predetermined threshold according to Equation (4). If the difference is less than the threshold ((MAX−AVG)<Th), the BS does not perform detection on the feedback signal, determining instead that the feedback signal is not reliable in step 915.

On the other hand, if the difference between the maximum sum and the average sum is equal to or greater than the threshold ((MAX−AVG)≧Th), the BS performs detection, considering that the information data of the codeword with the maximum sum is reliable in step 913.

Then the BS ends the process.

For 4-bit information data, given 3×3 subcarriers per tile, 8 modulation symbols and a pilot symbol in each tile are correlated with eight orthogonal vectors and a pilot symbol for all 16 codewords, for detection of fast feedback information as described above. In the case of 4×3 subcarriers per tile, four corner subcarriers carry pilots and the remaining eight subcarriers deliver modulation symbols, as described in FIG. 2. Thus, 8 modulation symbols and the four pilot symbols in each tile are correlated with the eight orthogonal vectors and the four pilot symbols, for detection of fast feedback information.

For 6-bit information data, each tile is correlated with an orthogonal vector including a pilot with respect to 64 codewords, for detection of feedback information.

In accordance with the present invention as described above, uplink fast feedback information is detected using pilot symbols in addition to the modulation symbols of a control subchannel carrying the fast feedback information in an OFDMA broadband wireless communication system. Therefore, information is accurately sent and system operation is stable.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. An apparatus for determining feedback information detection in a wireless communication system, comprising:
    a de-allocator for separating each tile from feedback information; and
    at least one correlator for correlating a plurality of modulation symbols and a pilot symbol of each tile with a plurality of symbols, corresponding to a codeword, and a pilot symbol for each codeword; and a channel decoder for summing squares of absolute values of the correlated symbols and pilot symbol for each codeword and determining a codeword having a maximum sum;

wherein the at least one correlator calculates squares of absolute values of the correlated symbols and pilot symbol;

wherein the channel decoder comprises a detection decider for deciding whether to perform detection on the feedback information, and wherein the detection decider determines that the feedback information is reliable if a difference between a maximum of the sums and an average of the sums is greater than or equal to a predetermined threshold, and the detection decider determines that the feedback information is not reliable if the difference between the maximum of the sums and the average of the sums is less than the predetermined threshold.

2. The apparatus of claim 1, wherein a number of the at least one correlator for each tile is equal to a number of modulation symbols and pilot symbol per tile.

3. The apparatus of claim 1, wherein the detection decider decides to perform detection on the feedback information if the feedback information is reliable, and the detection decider decides not to perform detection on the feedback information if the feedback information is not reliable.

4. The apparatus of claim 1, wherein the detection decider decides whether to perform detection by 5. The apparatus of claim 3, further comprising a detector for performing detection on the feedback information, if the feedback information is reliable.

6. A method of determining feedback information detection in a wireless communication system, comprising the steps of:

separating each tile from a feedback information;

correlating a plurality of modulation symbols and a pilot symbol of each tile with a plurality of symbols, corresponding to a codeword, and a pilot symbol for each codeword;

summing squares of absolute values of the correlated symbols and pilot symbol for each codeword;

selecting a codeword corresponding to a maximum of the sums of the squares of the absolute values of the correlated symbols and pilot symbol;

calculating a difference between the maximum of the sums and an average sum; and determining whether to perform detection on the feedback information by comparing the difference with a predetermined threshold.

7. The method of claim 6, further comprising performing detection on the feedback information, if the difference $$\max_n \left\{ \sum_{m=1}^{\# \text{ of tiles }(=6)} \left[ \left| \sum_{k=1}^{\# \text{ of Fast Feedback tones per tile }(=8)} X^*_{n,m,k} Y_{m,k} + \sum_{k'=1}^{\# \text{ of pilot tones per tile }(=1)} Q^*_{,m,k'} Y'_{m,k'} \right|^2 \right], n = 0, 1, \ldots, 15 \right\} -$$

$$\text{avrg}_n \left\{ \sum_{m=1}^{\# \text{ of tiles }(=6)} \left[ \left| \sum_{k=1}^{\# \text{ of Fast Feedback tones per tile }(=8)} X^*_{n,m,k} Y_{m,k} + \sum_{k'=1}^{\# \text{ of pilot tones per tile }(=1)} Q^*_{,m,k'} Y'_{m,k'} \right|^2 \right], n = 0, 1, \ldots, 15 \right\} \geq \text{threshold}$$

where $Y_{m,k}$ denotes a symbol received on a $k^{th}$ subcarrier in an $m^{th}$ tile, $Y'_{m,k'}$ denotes a pilot symbol received on a $k'^{th}$ subcarrier in the $m^{th}$ tile, $X_{n,m,k}$ denotes a orthogonal vector (symbol) corresponding to an $n^{th}$ codeword for the $k^{th}$ subcarrier in the $m^{th}$ tile, $Q_{m,k'}$ denotes a transmitted pilot symbol for the $k'^{th}$ subcarrier of the $m^{th}$ tile, n denotes a codeword index (e.g. $2^4$ (m=0, ..., 15)), m denotes a tile index (m=0, 1, ..., 5), k denotes a subcarrier index (k=0, 1, ... 7), and k' denotes a pilot subcarrier index and superscript denotes complex conjugate operation.

between the maximum of the sums and the average of the sums is greater than or equal to than the predetermined threshold.

8. The method of claim 6, further comprising discarding the feedback information, if the difference between the maximum of the sums and the average of the sums is less than the predetermined threshold.

9. The method of claim 6, wherein the detection determining step comprises determining whether to perform detection by $$\max_{n} \left\{ \sum_{m=1}^{\text{\# of tiles }(=6)} \left[ \left| \sum_{k=1}^{\substack{\text{\# of Fast Feedback tones} \\ \text{per tile }(=8)}} X^*_{n,m,k} Y_{m,k} + \sum_{k'=1}^{\text{\# of pilot tones per tile }(=1)} Q^*_{,m,k'} Y'_{m,k'} \right|^2 \right], \right.$$

$$\left. n = 0, 1, \ldots, 15 \right\} -$$

$$\underset{n}{\text{avrg}} \left\{ \sum_{m=1}^{\text{\# of tiles }(=6)} \left[ \left| \sum_{k=1}^{\substack{\text{\# of Fast Feedback tones} \\ \text{per tile }(=8)}} X^*_{n,m,k} Y_{m,k} + \sum_{k'=1}^{\text{\# of pilot tones per tile }(=1)} Q^*_{,m,k'} Y'_{m,k'} \right|^2 \right], \right.$$

$$\left. n = 0, 1, \ldots, 15 \right\} \geq \text{threshold}$$

where $Y_{m,k}$ denotes a symbol received on a $k^{th}$ subcarrier in an $m^{th}$ tile, $Y'_{m,k'}$ denotes a pilot symbol received on a $k'^{th}$ subcarrier in the $m^{th}$ tile, $X_{n,m,k}$ denotes a orthogonal vector (symbol) corresponding to an $n^{th}$ codeword for the $k^{th}$ subcarrier in the $m^{th}$ tile, $Q_{m,k'}$ denotes a transmitted pilot symbol for the $k^{th}$ subcarrier of the $m^{th}$ tile, n denotes a codeword index (e.g. $2^4$ (m=0, . . . , 15)), m denotes a tile index (m=0, 1, . . . , 5), k denotes a subcarrier index (k=0, 1, . . . 7), and k' denotes a pilot subcarrier index and superscript * denotes complex conjugate operation.

* * * * *